D. SOUTER.
PIPE COUPLING.
APPLICATION FILED SEPT. 16, 1919.

1,332,769.

Patented Mar. 2, 1920.

Inventor:
Dracos Souter.
by Wilkinson & Giusta.
Attorneys.

UNITED STATES PATENT OFFICE.

DRACOS SOUTER, OF BATON ROUGE, LOUISIANA.

PIPE-COUPLING.

1,332,769.  Specification of Letters Patent.  Patented Mar. 2, 1920.

Application filed September 16, 1919. Serial No. 324,075.

*To all whom it may concern:*

Be it known that I, DRACOS SOUTER, a citizen of the United States, residing at Baton Rouge, in the parish of East Baton Rouge and State of Louisiana, have invented certain new and useful Improvements in Pipe-Couplings; and I do hereby declare the following to be a full, clear, and exact description of the invention, such as will enable others skilled in the art to which it appertains to make and use the same.

The present invention relates to improvements in pipe couplings, and more particularly refers to an improved pipe coupling for use in connection with iron pipe, steel or rubber hose, and the like, and is more especially useful where such pipe or hose has to be frequently disconnected and re-connected. An object of the invention is to provide an improved pipe coupling in which a large surface is provided to receive a larger gasket than has been possible to use heretofore in present styles of pipe coupling, and one in which all through bolts are dispensed with and all bolt holes which are objectionable as allowing the escape of steam or other fluid therethrough.

A further object of the present invention resides in providing an improved pipe coupling which is capable of quick and convenient assembly and disassembly, and which will be rigid when coupled and of improved strength as compared with prior couplings.

In the accompanying drawings forming a part of this application, and in which similar reference symbols indicate corresponding parts in the several views.

Figure 1:
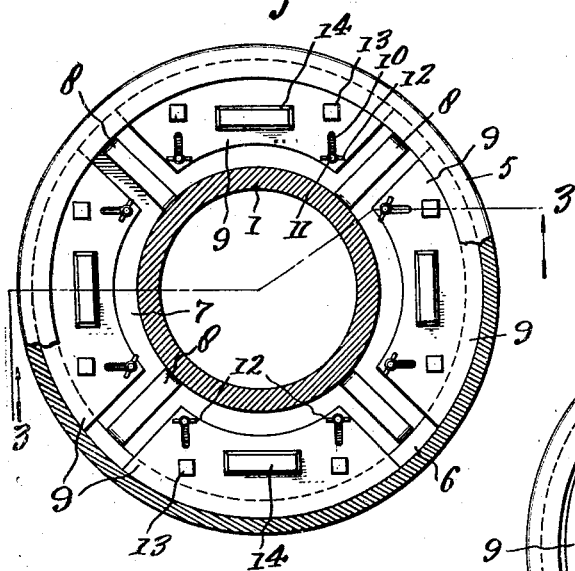
Figure 1 is a plan view of an improved pipe coupling constructed in accordance with the present invention, with parts shown in section and also showing the same applied to a pipe which appears in section.
Figure 2:
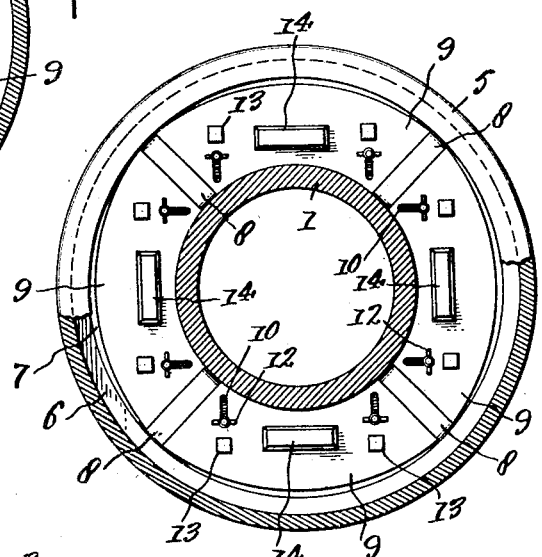
Fig. 2 is a similar view with the parts in another position.

The drawing shows only one embodiment of the invention, but it will be understood of course that the same is susceptible of embodiment in various other mechanical forms.

Figure 3:
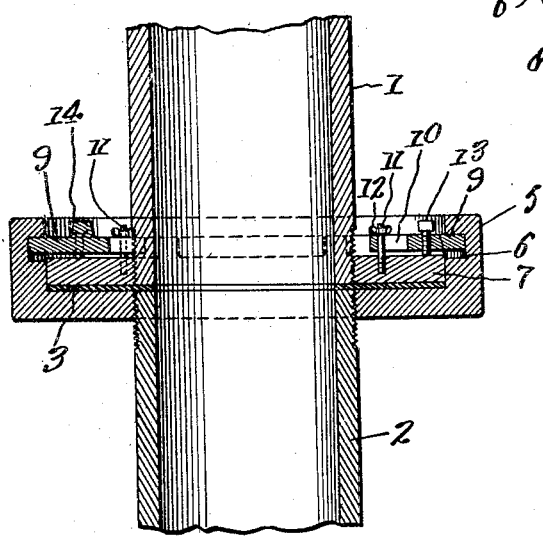
Fig. 3 is a longitudinal sectional view taken on the line 3—3 in Fig. 1.
Figure 4:
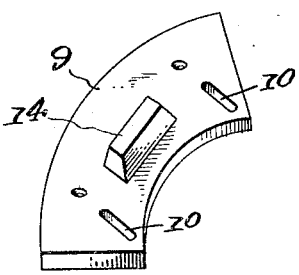
Fig. 4 is a perspective view of one of the sector plates.

Referring more particularly to the drawings, 1 and 2 designate adjacent ends of pipes to be coupled together and being screw threaded as shown in Fig. 3. The gasket 3 is shown as projecting between the ends of the pipe sections 1 and 2 and as extending for a considerable distance beyond the pipe sections; this gasket 3 being of unusually large size to enhance the packing of the joint between the two pipe sections.

A ring or collar 4 is screw threaded and run on the threads of the pipe coupling 2 in such a manner that its end face will project flush with the ends of the pipe section 2 and the gasket 3 will lie thereagainst. The ring or collar 4 has an annular flange 5 projecting from the outer portion thereof and surrounding the adjacent end of the pipe section 1. The flange 5 has an undercut portion or groove 6 formed therein. A ring or annulus 7 is screw threaded and adapted to be run on the threads of the pipe section 1 in such manner that its outer face is flush with the outer end of the pipe section 1, whereby the ring or annulus 7 may lie against the opposite face of the gasket 3; such gasket being clamped between the annulus 7 and the collar 4, as clearly shown in Fig. 3. The annulus 7 is of such size as to closely fit within the flange 5, and extends for the greater part inwardly of the undercut portion or groove 6.

As shown in Fig. 1, radial ribs 8 are formed on the annulus 7 on that face thereof opposite to the gasket 3, and such ribs 8 divide the surface of the annulus 7 into a number, preferably four, of compartments for receiving sector plates 9. The plates 9 are provided each with a pair of elongated slots 10 through which engage threaded bolts 11 having thumb nuts 12 which may be tightened on the sector plates 9. The slots 10 admit of the sector plates moving readily into and out of the undercut portion or groove 6 in the flange 5.

There are also screws 13 carried by the sector plates 9 and adapted to have their inner ends bear against the adjacent face of the annulus 7 for binding the sector plates and the annulus in place. Bosses 14 are formed on the sector plates 9 preferably centrally thereof, and may be engaged by the hand for forcing the sector plates readily outward and into the groove 6, or such bosses 14 are useful for receiving blows from a hammer which at times is necessary for driving the plates into place.

In use the collar 4 and annulus 7 are run on their adjacent pipe sections 1 and 2 and the pipe sections are thereupon brought together on the gasket 3, the flange 5 fitting over the annulus 7. The sector plates 9 are thereupon put in place between the ribs 8 and forced, either by hand or by hammer blows, radially outward, so that the outer portions of the plates 9 engage under the walls of the groove 6 in the flange 5. The screws 13 are thereupon tightened, forcing the sector plates 9 and the annulus 7 apart, so that the annulus 7 and collar 4 are squeezed tightly together on the gasket 3 and the sector plates 9 are forced tightly against the wall of the groove 6, thereby holding these plates in place and preventing the accidental disassembly of the coupling.

It will be noted that no bolt holes are made in the gasket 3 and no bolts pass therethrough such as would be likely to invite the escape of steam or other fluid, but the gasket 3 is of enlarged diameter and the annulus 7 and collar 4 afford large surfaces for clamping the gasket 3 so that a relatively large and tight joint is provided.

The loosening of such screws 13 allows the sector plates 9 to be withdrawn radially inward so as to escape the groove 6, and when this condition is brought about the parts of the coupling may be readily disassembled.

The coupling, by reason of the simplicity of its assembly and disassembly, is highly advantageous for use in steam and hose fittings, although it will also have a wide application in many other uses.

It is obvious that those skilled in the art may vary the details of construction and arrangements of parts without departing from the spirit of my invention, and therefore I do not wish to be limited to such features except as may be required by the claims.

I claim:

1. An improved pipe coupling engaging a pair of opposed members of relatively great diameter threaded on the ends of sections of pipe to be coupled, a relatively large gasket placed between the ends of the pipe sections and said members, a flange on one of said members embracing the other member and having a groove therein, and means associated with the other member and adapted to be moved into and out of said groove, said means having a device for expanding said means and the member carrying same whereby to forcibly clamp said members on said gasket, substantially as described.

2. An improved pipe coupling including a collar adapted to be threaded on one section of pipe, an annulus adapted to be threaded on a second section of pipe, a gasket interposed between said collar and annulus, a flange on said collar embracing said annulus and having a groove on its inner side, and sector plates associated with said annulus and movable into said groove, with means carried by said sector plates for expanding the same against the wall of the groove and causing the annulus and collar to be tightly clamped against said gasket, substantially as described.

3. In an improved pipe coupling, the combination with a pair of pipes to be coupled, said pipes having screw threaded ends, of an improved coupling including a threaded collar run on the end of one of said pipes, a threaded annulus run on the other pipe, a gasket clamped between said collar and annulus, a flange on said collar having an annular groove on its inner face, sector plates having slots therein, means passing through the slots for securing the sector plates through said annulus, said sector plates adapted to project into said groove, means on the sector plates by which the same may be moved, and screws carried by the sector plates for engaging said annulus to bind the sector plates in place and force the annulus and collar together on said gasket, substantially as described.

DRACOS SOUTER.